United States Patent
De Jong

[11] 3,775,619
[45] Nov. 27, 1973

[54] DEVICE FOR COMPOSING AN INFRARED IMAGE

[75] Inventor: Arie N. De Jong, Pijnacker, Netherlands

[73] Assignee: Nederlandse Organisatie voor Toegepast Natwurwetenschappelijk Onderzoeh ten behoeve van de Rijksverdehiging, The Hague, Netherlands

[22] Filed: June 4, 1971

[21] Appl. No.: 150,213

Related U.S. Application Data

[63] Continuation of Ser. No. 849,411, Aug. 12, 1969, abandoned.

[30] Foreign Application Priority Data
Sept. 19, 1968  Netherlands.................. 6813387

[52] U.S. Cl...................................... 250/347, 350/7
[51] Int. Cl. ............................................... G01t 1/16
[58] Field of Search................ 250/83.3 H, 83.3 HP, 250/234, 347; 350/7

[56] References Cited
UNITED STATES PATENTS

| | | | |
|---|---|---|---|
| 3,460,892 | 8/1969 | Dolin.................................. | 350/7 X |
| 3,508,051 | 4/1970 | Nichols et al.............. | 250/83.3 H X |
| 3,448,284 | 6/1969 | Friesecke............................ | 250/234 |
| 3,647,956 | 3/1972 | Buck et al.......................... | 350/7 X |

*Primary Examiner*—James W. Lawrence
*Assistant Examiner*—Davis L. Willis
*Attorney*—Watson, Cole, Grindle & Watson

[57] ABSTRACT

The invention relates to a device for composing an infrared image, which device is provided with a rotating body for scanning the infrared object to be imaged, and for recomposing the visible image.

The rotating body comprises a disc with at least five abutting, outwardly reflecting roof-edge mirrors, regularly provided on the periphery of the disc.

5 Claims, 3 Drawing Figures

3,775,619

DEVICE FOR COMPOSING AN INFRARED IMAGE

This application is a continuation of Ser. No. 849,411 filed Aug. 12, 1969 and now abandoned.

The invention relates to a device for composing an infrared image provided with a rotating reflecting body for scanning the object line by line, a detector placed near that body and a reproduction system synchronized with the scanning movement. Such a device is known in the art as an infrared camera. In such infrared cameras a germanium cube is used as the means for effecting the scanning motion. During the scanning motion the germanium cube turns around a shaft, going through the centre of two opposite planes of the cube. A lens is disposed in the path of the rays ahead of the cube which throws an image on the heat detector behind the cube. By rotating the cube the image on the detector is moved along a line, that is, at a motionless image on the detector, a line is scanned in the field of vision of the camera.

Such prior art device is not without drawbacks. For instance rigorous precautions must be taken to prevent variable radiation reflections. Such reflections are inter alia a result from diffusion of the light beam when it passes through the rotating cube. These reflections disturb the image on the detector. Also, such a device does not present a simple solution for synchronizing the reproduction system with the scanning motion. It is therefore the object of the present invention to avoid these drawbacks. Accordingly the invention is characterized in that the body or means for effecting the scanning motion comprises a disc with at least five abutting outwardly reflecting roof-edge-mirrors, regularly provided on the periphery of the disc. A detector, imaged on the cylinder periphery through the cams of the roofs of the roof-edge-mirrors, with a sawtooth motion scans a line, the radiation being reflected against two mirroring planes being at right angles. Whenever a cam of a roof-edge-mirror of the rotating body passes the image of the detector, the scanning jumps back to the beginning of the line to be scanned which itself is scanned between two cams. By application of the body it is possible to image more than one radiation detector on the cylinder periphery through the cams of the roofs of the roof-edge-mirrors with the aid of a lens system or mirror system. Owing to this, it is possible to scan simultaneously as many lines in the field of vision of the device as there are detectors. A simple construction is obtained if the mechanical shaft of the disc makes an angle not equal to ninety degrees with the optical axis of the imaging system of the radiation detectors. If with the aid of a lens system or a mirror system, as many crater lamps as detectors are imaged on the cylinder periphery through the cams of the roofs of the roof-edge-mirror, then a simple and reliable mechanical synchronisation is realised between systems of perception and reproduction. To obtain a simple structure the mechanical shaft of the disc should preferably be provided at an angle not equal to ninety degrees with the optical axis of the imaging system of the crafter lamps. In an embodiment of the invention the imaging systems of the detectors and the crater lamps are mounted to a yoke movable with respect to the disc, the yoke being movable in a plane through the axis of the disc, and means being present to allow that movement to operate with a sawtooth motion.

The invention will be further explained with reference to the drawing wherein.

In the figures like numbers refer to like elements.

Figure 1:
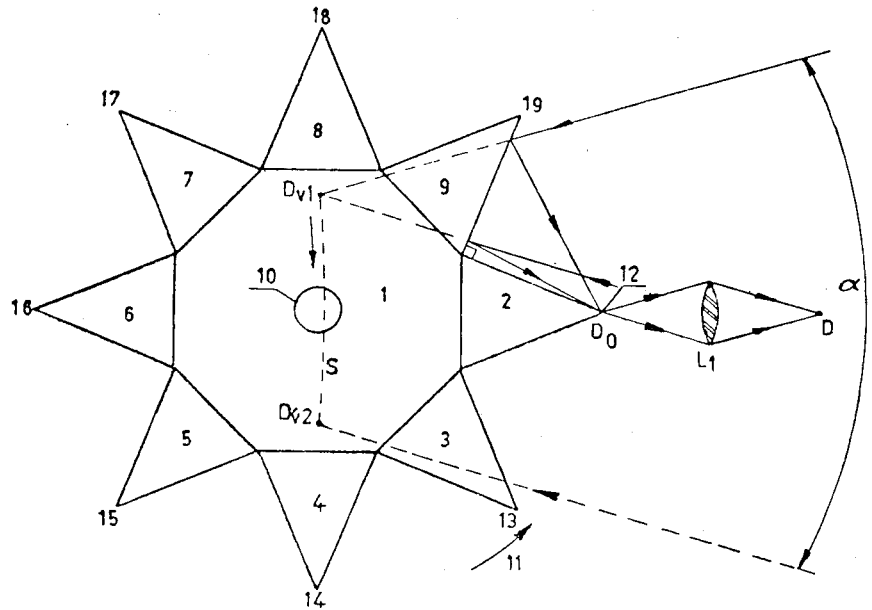
FIG. 1 shows in an upper view a body according to the invention with eight roof-edge-mirrors and a detector that is imaged on the cam of a roof of a roof-edge mirror.

In FIG. 1 disc 1 is provided with eight roof-edge-mirrors 2 to 9 rotatable in the direction of arrow 11 around shaft 10 drawn in an upper view. A detector D is imaged by lens $L_1$ on the cylinder periphery through cams 12 to 19 of mirrors 2 to 9. Image D just before cam 12 gives a virtual image $D_{v1}$.

By rotating disc 1 in the direction of arrow 11 so that image $D_0$ comes right across cam 12, a virtual image $D_{v2}$ arises. If disc 1 is rotated farther so that image $D_0$ is just before cam 13 then, during this movement of disc 1, the virtual image $D_v$ has covered path $s$ from $D_{v2}$ to $D_{v1}$. Consequently virtual image $D_v$ jumps from $D_{v1}$ to $D_{v2}$ when a cam 12 to 19 moves along $D_0$ and virtual image $D_v$ moves across path $s$ from $D_{v2}$ back to $D_{v1}$ when disc 1 moves across a sector before two cams 12 to 19 along $D_0$. Inversely, an object in the field of vision of roof-edge-mirrors 12 to 19 indicated by angle $\alpha$ in FIG.1 will be scanned with a sawtooth motion by a point-shaped detector D through a line. If, thereafter, the detector is moved slowly and also with a sawtooth motion parallel to shaft 10 in a plane through shaft 10 then the object is scanned by a number of parallel lines in a direction perpendicular to that for the line-scanning.

Figure 2:
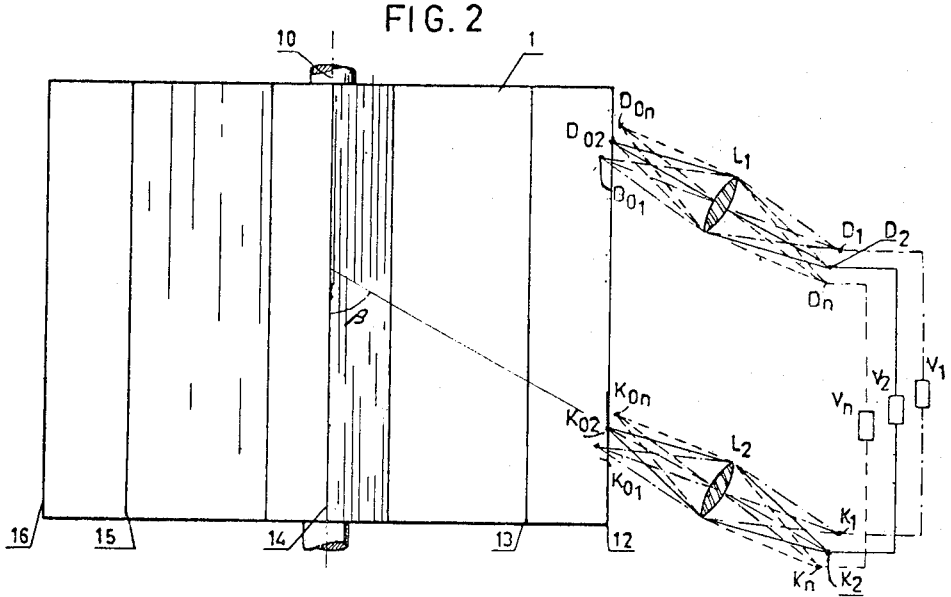
FIG. 2 shows in a side-view a body according to FIG. 1 with three detectors for scanning three parallel lines simultaneously and three crater lamps of the reproduction system which are synchronized with the detectors.

In FIG.2 detectors $D_1$ to $D_n$ are imaged on rib 12 of body 1 via lens $L_1$. The optical axis of the imaging system makes an angle $\beta$ with mechanical shaft 10 of body 1. In order to obtain a correct synchronisation, crater lamps $K_1$ to $K_n$ must be in the same position with respect to body 1 as detectors $D_1$ to $D_n$, for this purpose these crater lamps are presented on rib 12 of body 1 via lens $L_2$. The optical axis of the reproduction system also makes an angle $\beta$ with mechanical shaft 10 of disc 1. Detectors $D_1$ to $D_n$ modulate in intensity crater lamps $K_1$ to $K_n$ via amplifiers $V_1$ to $V_n$. By application of a number of detectors $D_1$ to $D_n$, a corresponding number of amplifiers $V_1$ to $V_n$ and an equal number of crater lamps $K_1$ to $K_n$, a number of lines of an object to be scanned can be reproduced simultaneously or all lines required for scanning an object at once, can be reproduced. In the latter case it is not necessary to shift detectors $D_1$ to $D_n$ and crater lamps $K_1$ to $K_n$ in a plane through shaft 10 and consequently the means for scanning in a direction perpendicular to the line-scanning fall off.

Figure 3:
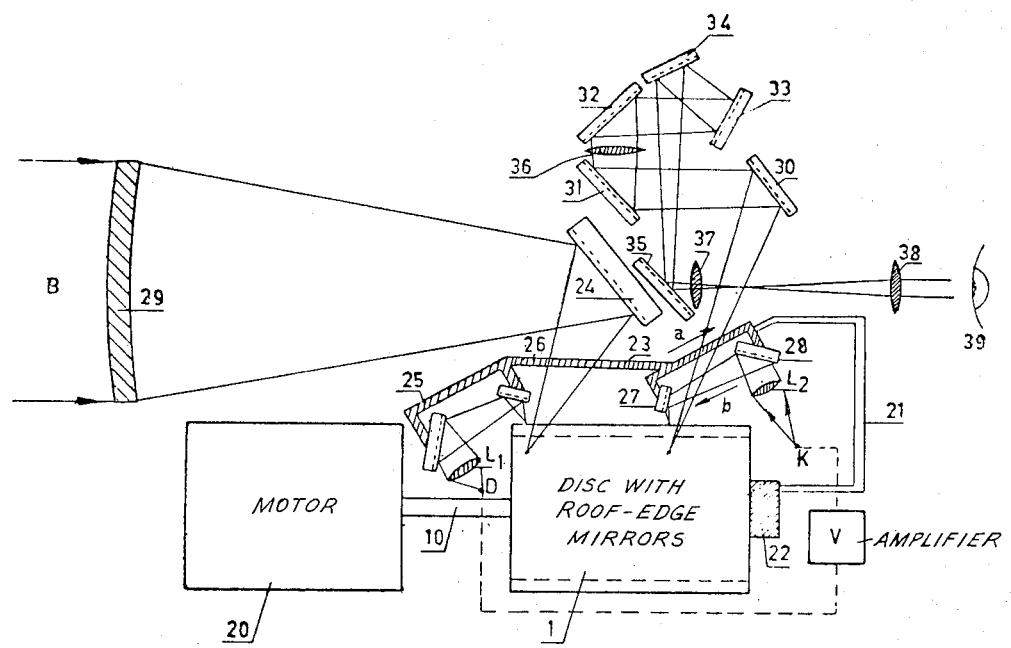
FIG. 3 shows a schematic diagram of an embodiment of an infrared field-glass according to the invention.

FIG.3 shows an infrared viewer with 25 images a second. Shaft 10 of body 1 is driven by motor 20. A programming disc 22 connected to body 1 controls yoke 23 with a sawtooth motion via a mechanical coupling 21 i.e. repeats successively slowly and uniformly in arrow direction $a$ and fast and uniformly in arrow direction $b$. To yoke 23 are connected mirrors 25 to 28. An infrared beam B converged by lens 29 falls on body 1 via mirror 24. Body 1 reflects the beam to detector D via mirrors 25 and 26 and lens $L_1$. A crater lamp K projects its light to body 1 via lens $L_2$ and mirrors 27 and 28. Body 1 reflects the light via mirrors 30 to 35 and lens 36 to 38. The beam that can be caught by eye 39 of the observer emerges from ocular lens 38. For the electric synchronisation crater lamp K is connected to detector D via an amplifier V. The intensity of lamp K thereby follows for visible light the lighting of detector D for infrared light.

I claim:

1. A device for composing an infrared image provided with a rotating reflecting body for scanning an object line by line, a detector placed near that body and a reproduction system synchronised with the scanning movement, wherein the body comprises a disc with at least five abutting outwardly reflecting roof-edge mirrors, regularly provided on the periphery of the disc, wherein the basic angles of the roof-edge mirrors are chosen such that the reflecting surfaces of two mirrors adjacent one another are at right angles, the apex angle of each said mirror therefore being determined by the formula: $90° - (360°/n)$ in which $n$ represents at least five mirrors, and wherein, with the aid of an optical system, at least one radiation detector and at least one crater lamp is imaged on the cylinder periphery through the cams of the roofs of the roof-edge mirrors.

2. A device according to claim 1, wherein with the aid of an optical system at least one radiation detector is imaged on the cylinder periphery through the cams of the roofs of the roof-edge mirrors.

3. A device according to claim 1 wherein a mechanical shaft of the disc makes an angle other than 90° with the optical axes of the imaging systems of the crater lamps.

4. A device according to claim 1 wherein the imaging systems of the detectors and the crater lamps are mounted to a yoke movable with respect to the disc.

5. A device according to claim 4, wherein the yoke can move in a plane through the shaft of the disc and wherein means are provided for allowing that movement to proceed with a sawtooth motion.

* * * * *